United States Patent
Liu et al.

(10) Patent No.: US 10,368,325 B2
(45) Date of Patent: Jul. 30, 2019

(54) SYSTEM AND METHOD FOR BEAM ADAPTATION IN A BEAM-BASED COMMUNICATIONS SYSTEM

(71) Applicant: Futurewei Technologies, Inc., Plano, TX (US)

(72) Inventors: Bin Liu, San Diego, CA (US); Pengfei Xia, San Diego, CA (US); Aimin Justin Sang, San Diego, CA (US); Richard Stirling-Gallacher, Munich (DE)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 78 days.

(21) Appl. No.: 15/791,968

(22) Filed: Oct. 24, 2017

(65) Prior Publication Data
US 2018/0227862 A1  Aug. 9, 2018

Related U.S. Application Data

(60) Provisional application No. 62/454,391, filed on Feb. 3, 2017.

(51) Int. Cl.
*H04W 52/14* (2009.01)
*H04W 52/36* (2009.01)
*H04W 76/27* (2018.01)
*H04B 7/06* (2006.01)
(Continued)

(52) U.S. Cl.
CPC .......... *H04W 52/365* (2013.01); *H04B 7/063* (2013.01); *H04B 7/0617* (2013.01);
(Continued)

(58) Field of Classification Search
CPC .... H04B 7/0617; H04B 7/063; H04B 7/0404; H04B 7/0408; H04B 7/0626;
(Continued)

(56) References Cited

U.S. PATENT DOCUMENTS

| 2010/0093386 | A1 | 4/2010 | Damnjanovic et al. |
| 2011/0105174 | A1* | 5/2011 | Pelletier ............... H04W 52/42 455/522 |

(Continued)

FOREIGN PATENT DOCUMENTS

| CN | 102438304 A | 5/2012 |
| WO | 2014104800 A1 | 7/2014 |

OTHER PUBLICATIONS

Rappaport, Theodore S. et al., Millimeter Wave Wireless Communications, Prentice Hall, Boston, 2015, Table of Contents, Introduction, Index, total 74 pages.
(Continued)

*Primary Examiner* — Quan M Hua
(74) *Attorney, Agent, or Firm* — Futurewei Technologies, Inc.

(57) ABSTRACT

A method for beam adaptation in a beam-based communications system is provided. The beam-based communications system includes user equipment (UE) and a transmit-receive point (TRP). The method includes that UE determines a beamforming gain headroom (BHR) based on a UE maximum beamforming gain and a beamforming gain of a UE beam between the UE and the TRP, sends the BHR to the TRP, and receives a beam adaptation indication from the TRP.

18 Claims, 8 Drawing Sheets

(51) Int. Cl.
*H04W 72/04* (2009.01)
*H04W 52/42* (2009.01)
*H04W 88/02* (2009.01)
*H04B 7/0404* (2017.01)

(52) U.S. Cl.
CPC ......... *H04W 52/42* (2013.01); *H04W 72/046* (2013.01); *H04W 72/0413* (2013.01); *H04W 76/27* (2018.02); *H04B 7/0404* (2013.01); *H04W 88/02* (2013.01)

(58) Field of Classification Search
CPC .. H04B 7/0632; H04B 7/0639; H04B 7/0695; H04B 7/088; H04W 52/16; H04W 52/325; H04W 52/52; H04W 72/042; H04W 72/0473; H04W 24/10; H04W 52/146; H04W 52/242; H04W 52/32; H04W 52/362; H04W 52/365; H04W 52/367; H04W 52/42; H04W 52/54; H04W 72/0413; H04W 72/046; H04W 72/1226; H04W 76/27; H04W 88/02; Y02D 70/1262; Y02D 70/142
See application file for complete search history.

(56) References Cited

U.S. PATENT DOCUMENTS

2013/0044650 A1* 2/2013 Barker ................ H04B 7/0617
370/278
2018/0235013 A1* 8/2018 Jung ................ H04W 74/0833

OTHER PUBLICATIONS

S. Yong et al., Eds., 60 GHz Technology for Gbps WLAN and WPAN: From Theory to Practice, John Wiley & Sons, 2010.
W. Hong et al., "Study and Prototyping of Practically Large-Scale mmWave Antenna Systems for sG Cellular Devices," IEEE Communications Magazine, Sep. 2014, pp. 63-69.
3GPP TSG RAN WG1 Meeting #86, "RAN1 Chairman's Notes," Gothenburg, Sweden, Aug. 22-26, 2016, total 105 pages.
3GPP TSG RAN WG1 Meeting #86bis, "RAN1 Chairman's Notes," Lisbon, Portugal, Oct. 10-14, 2016, total 113 pages.
3GPP TSG RAN WG1 Meeting NR Ad-Hoc, "RAN1 Chairman's Notes," Spokane, USA, Jan. 16-20, 2017, total 61 pages.

* cited by examiner

Fig. 2B
Fig. 2C
*RRCConnectionReconfiguration message*
```
MAC-MainConfig ::=            SEQUENCE {
   ul-SCH-Config              11
   drx-Config                 release
   timeAlignmentTimerDedicated    TimeAlignmentTimer,
   phr-Config                 setup
   bhr-Config                  setup     }
```
Fig. 2D

RRCConnectionReconfiguration message

```
MAC-MainConfig ::=              SEQUENCE {
   ul-SCH-Config                11
   drx-Config                   release
   timeAlignmentTimerDedicated       TimeAlignmentTimer,
   Phr-Config(
        bhr-config
        phr-config)             }
```

*Fig. 2E*

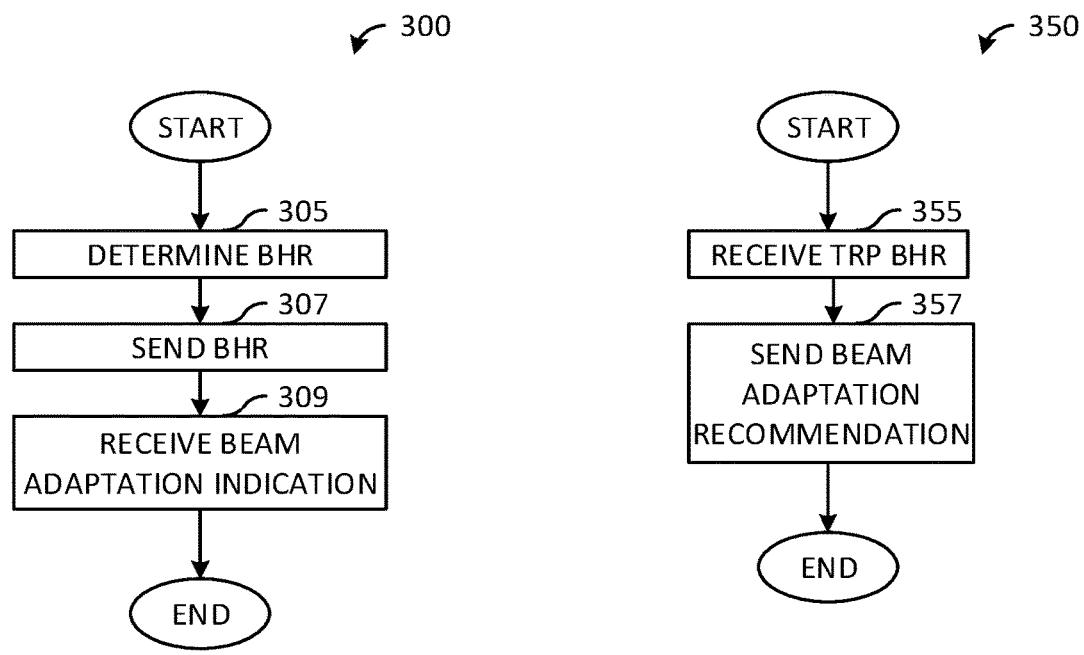

SYSTEM AND METHOD FOR BEAM ADAPTATION IN A BEAM-BASED COMMUNICATIONS SYSTEM

CROSS-REFERENCE TO RELATED APPLICATION

This application claims the benefit of U.S. Provisional Application No. 62/454,391, filed on Feb. 3, 2017, entitled "System and Method for Beam Adaptation in A Beam-Based Communications System," which application is hereby incorporated herein by reference.

TECHNICAL FIELD

The present invention relates generally to a system and method for digital communications, and, in particular embodiments, to a system and method for beam adaptation in a beam-based communications system.

BACKGROUND

In the fifth generation (5G) new radio (NR) communications device architecture, beamformed transmissions and receptions will be used. Compared to low frequency (LF) communications systems, beamforming is needed in high frequency (HF) communications systems to bridge the link budget due to severe path loss experienced at these high frequencies.

SUMMARY

Example embodiments provide a system and method for beam adaptation in a beam-based communications system.

In accordance with an example embodiment, a method for beam adaptation in a beam-based communications system is provided. The method includes receiving, by a transmit-receive point (TRP), a beamforming gain headroom (BHR) report from user equipment (UE), and sending, by the TRP, a beam change indicator to the UE in accordance with the BHR.

In accordance with an example embodiment, a method for beam adaptation in a beam-based communications system including UE and a TRP is provided. The method includes determining, by the UE, a beamforming gain headroom (BHR) based on a UE maximum beamforming gain and a beamforming gain of a UE beam between the UE and the TRP; sending, by the UE, the BHR to the TRP; and receiving, by the UE, a beam adaptation indication from the TRP.

In a possible implementation of the example embodiment, where the sending the BHR to the TRP includes: sending, by the UE, the UE maximum beamforming gain to the TRP through a MAC-CE, or an RRC message; and sending, by the UE, the beamforming gain of the UE beam between the UE and the TRP through a MAC-CE, or an RRC message, or a PUCCH.

In accordance with an example embodiment, a method for beam adaptation in a beam-based communications system is provided. The method includes determining, by a TRP, a BHR, sending, by the TRP, a BHR indicator to UE, and receiving, by the TRP, a beam change recommendation from the UE.

In accordance with an example embodiment, a method for beam adaptation in a beam-based communications system including UE and a TRP is provided. The method includes determining, by the TRP, a beamforming gain headroom (BHR) based on a TRP maximum beamforming gain and a beamforming gain of a TRP beam between the TRP and the UE; sending, by the TRP, the BHR to the UE; and receiving, by the TRP, a beam adaptation recommendation from the UE.

In a possible implementation of the example embodiment, where the sending the BHR to the UE includes: sending, by the TRP, the TRP maximum beamforming gain to the UE through a MAC-CE, or an RRC message; and sending, by the TRP, the beamforming gain of the TRP beam between the TRP and the UE through a MAC-CE, or an RRC message, or a PDCCH.

In accordance with an example embodiment, a method for beam adaptation in a beam-based communications system is provided. The method includes determining, by UE, a BHR, sending, by the UE, the BHR to a TRP in accordance with the BHR, and receiving, by the UE, a beam change indicator from the TRP.

In accordance with an example embodiment, a method for beam adaptation in a beam-based communications system is provided. The method includes receiving, by a TRP, a beam type set report from UE, and sending, by the TRP, a beam change indicator to the UE in accordance with the beam type set report.

In accordance with an example embodiment, a method for beam adaptation in a beam-based communications system is provided. The method includes sending, by UE, a beam type set report to a TRP, and receiving, by the UE, a beam change indicator from the TRP.

In accordance with an example embodiment, a method for beam adaptation in a beam-based communications system is provided. The method includes receiving, by UE, a beamforming gain headroom (BHR) indicator from a TRP, and sending, by the UE, a beam change recommendation to the TRP in accordance with a BHR indicated by the BHR indicator.

In accordance with an example embodiment, UE in a beam-based communications system, is provided. The UE includes a memory storage storing instructions; and one or more processors in communication with the memory, wherein the one or more processors executes the instructions to: determine a beamforming gain headroom (BHR) based on a UE maximum beamforming gain and a beamforming gain of a UE beam between the UE and a transmit-receive point (TRP); send the BHR to the TRP; and receive a beam adaptation indication from the TRP.

In a possible implementation of the example embodiment, the BHR is a difference between the UE maximum beamforming gain and the beamforming gain of the UE beam between the UE and the TRP. The difference is indicated in a medium access control-control element (MAC-CE), or a radio resource control (RRC) message, or a physical uplink control channel (PUCCH).

In accordance with an example embodiment, TRP in a beam-based communications system, is provided. The TRP includes a memory storage storing instructions; and one or more processors in communication with the memory, wherein the one or more processors executes the instructions to: determining, by the TRP, a beamforming gain headroom (BHR) based on a TRP maximum beamforming gain and a beamforming gain of a TRP beam between the TRP and the UE; sending, by the TRP, the BHR to the UE; and receiving, by the TRP, a beam adaptation recommendation from the UE.

In a possible implementation of the example embodiment, the BHR is a difference between the TRP maximum beamforming gain and the beamforming gain of the TRP beam between the TRP and the UE. The difference is indicated in a MAC-CE, or an RRC message, or a physical downlink control channel (PDCCH).

Practice of the foregoing embodiments enables the dynamic adaptation of beams to meet changing operating environments, service requirements, and user scenarios, to yield optimal performance.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2B illustrates an example of a MAC control element according to example embodiments described herein;

FIG. 2C illustrates another example of a MAC control element according to example embodiments described herein;

FIG. 2D illustrates an example of an RRC message according to example embodiments described herein;

FIG. 2E illustrates another example of an RRC message according to example embodiments described herein;

FIG. 3B illustrates a flow diagram of example operations 300 occurring in UE performing beam adaptation using UE BHR according to example embodiments described herein;

FIG. 3C illustrates a flow diagram of example operations 350 occurring in UE performing beam adaptation using TRP BHR according to example embodiments described herein;

DETAILED DESCRIPTION OF ILLUSTRATIVE EMBODIMENTS

The making and using of the presently example embodiments are discussed in detail below. The specific embodiments discussed are merely illustrative of specific ways to make and use the embodiments.

Figure 1:
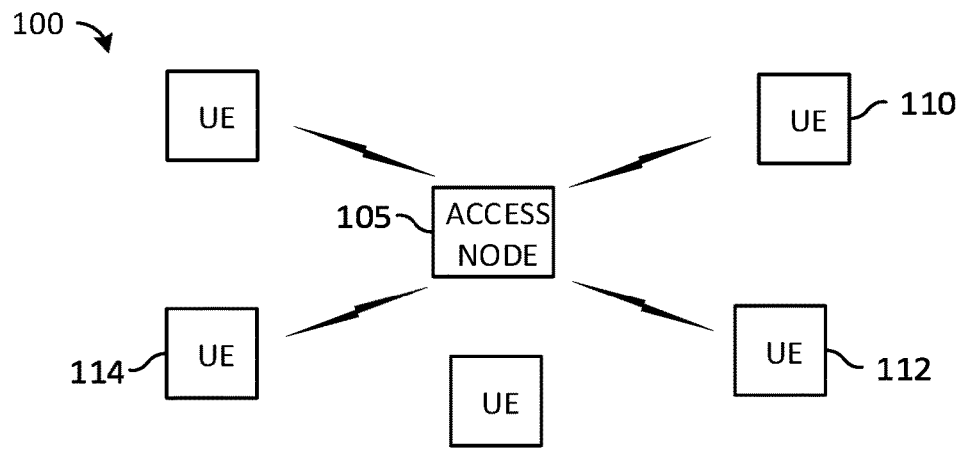
FIG. 1 illustrates an example communications system according to example embodiments described herein.

FIG. 1 illustrates an example communications system 100. Communications system 100 includes an access node 105 serving a plurality of user equipments (UEs), such as UEs 110, 112, and 114. In an example operating mode, transmissions for UEs as well as transmissions by UEs pass through access node 105. Access node 105 allocates beamformed resources for the transmissions to or from the UEs. Access nodes may also be commonly referred to as evolved NodeBs (eNBs), base stations, NodeBs, g NodeBs (gNB), master eNBs (MeNBs), secondary eNBs (SeNBs), master gNBs (MgNBs), secondary gNBs (SgNBs), remote radio heads, access points, and so forth. UEs may also be commonly referred to as users, mobiles, mobile stations, stations, subscribers, terminals, and so on. While it is understood that communications systems may employ multiple access nodes capable of communicating with a number of UEs, only one access node, and five UEs are illustrated for simplicity.

As discussed previously, beamforming is considered to be a requirement for communications in high frequency (HF) communications systems, such as communications systems operating above 6 GHz, e.g., millimeter wave (mmWave) communications systems. However, for different operating environments, service requirements, and user scenarios, different beams with different characteristics (e.g., beam width) may be preferred. In general, operating environments, service requirements, and user scenarios can change over time. Therefore, a static configuration of beam characteristics may not yield optimal performance over an extended amount of time. A more dynamic beam adaptation of the beam characteristics may lead to a better utilization of time, frequency, and/or spatial resources in a beam-based communications system. Therefore, there is a need for a system and method for beam adaptation. The system and method may be triggered based on reports or measurements.

In the Third Generation Partnership Project (3GPP) RAN1 #86 meeting, a variety of downlink Layer 1 and/or Layer 2 beam management procedures were agreed upon. They include procedures for one or more transmit-receive points (TRPs). A TRP may include, but not be limited to, Access node 105 as described in FIG. 1:

Procedure-1 (P-1): Used to enable UE measurement on different TRP transmit beams to support the selection of TRP transmit beams and/or UE receive beams,
  For beamforming at the TRP, an intra and/or inter TRP transmit beam sweep from a set of different beams is typically included;
  For beamforming at the UE, an UE receive beam sweep from a set of different beams is typically included; and
  TRP transmit beam and UE receive beam determination, either jointly or sequentially, are for further study.

P-2: Used to enable UE measurement on different TRP transmit beams to possibly change intra and/or inter TRP transmit beams,
  Potentially involving a smaller set of beams for beam refinement than in Procedure-1; and
  Procedure-2 may be a special case of Procedure-1.

P-3: Used to enable UE measurement on the same TRP transmit beam to change the UE receive beam in the case that the UE uses beamforming.

In the 3GPP RAM #86bis meeting, it was agreed that uplink beam management in 5G NR is for further study, with similar procedures being defined as downlink beam management with details being for further study. As illustrative examples:

Uplink-1 (U-1): Used to enable TRP measurement on different UE transmit beams to support the selection of UE transmit beams and/or TRP receive beams (it is noted that this is not necessarily useful in all cases).

U-2: Used to enable TRP measurement on different TRP receive beams to possibly change and/or select inter and/or intra TRP receive beams.

U-3: Used to enable TRP measurement on the same TRP receive beam to change UE transmit beam in the situation when the UE uses beamforming.

As related to the 3GPP RAN1 NR January Ad Hoc meeting, working assumptions include:

NR supports at least one network-controlled mechanism for beam management for uplink transmissions.
Details are for further study (FFS), including:
Signal(s) for the mechanism(s) if necessary
For example, sounding reference signal (SRS), physical random access channel (PRACH), uplink demodulation reference signal (DMRS), and so on.
Method(s) and content for TRP to indicate selected UE transmit beam and configure UE beam sweeping.
Impact of beam correspondence status
For example, when to use the mechanism(s),
For example, procedures (such as U-1, U-2, and U-3) and beam correspondence based procedure.
UE capability reporting
For example, capability of analog beamforming.
Cases when uplink and downlink are from the same TRP and/or from different TRPs are considered.
Determine conditions when the mechanism is particularly useful.

In the 3GPP RAN1 NR January Ad Hoc meeting, it was agreed that for the definition of beam correspondence, the previous working assumption of the definition was confirmed. The definition/terminology is for the convenience of discussion. Furthermore, detailed performance conditions are up to 3GPP RAN4. Working assumptions include definitions for transmit/receive beam correspondence at the TRP and UE, which are as follows:

Transmit/receive beam correspondence at the TRP holds if at least one of the following is satisfied:
  The TRP is able to determine a TRP receive beam for the uplink reception based on the UE's downlink measurement on the TRP's one or more transmit beams.
  The TRP is able to determine a TRP transmit beam for the downlink transmission based on the TRP's uplink measurement on the TRP's one or more receive beams.
Transmit/receive beam correspondence at the UE holds if at least one of the following is satisfied:
  The UE is able to determine a UE transmit beam for the uplink transmission based on the UE's downlink measurement on the UE's one or more receive beams.
  The UE is able to determine a UE receive beam for the downlink reception based on the TRP's indication based on uplink measurement on the UE's one or more transmit beams.
Additional refinement of the definitions may be presented and discussed.

It is noted that a capable TRP and/or UE can form different types of beams, e.g., with different beam widths, beamforming gains, and so forth, for different channel conditions or user scenarios. The TRP needs to be informed regarding the beamforming capability of the UE. The TRP may need to be informed regarding associated metrics to make a proper decision regarding the triggering of a beam type change at the UE. As an example, in a situation where UE is moving away from the TRP, the transmit/receive beams of the UE may need to be switched from a wide beam width to a narrow beam width to obtain more beamforming gain and therefore make up for the additional path loss. As another example, in a situation where UE is changing from stationary or low speed mobility to relatively high speed mobility, a wider beam width may be preferred for a more robust connection. The TRP may also autonomously adapt TRP transmit/receive beams to cope with a change in operating environment, such as channel condition, UE mobility, and so on. A TRP and/or UE beam type change may also trigger uplink and/or downlink beam management to realign and/or refine the beams from the perspective of both the TRP and the UE.

It is noted that beamforming gain plays an important role in making up the link budget in HF transmissions due to the severe path loss at the higher frequencies. Additionally, narrower beams are preferred to provide higher beamforming gain. On the other hand, for link robustness, a wide beam is preferred, especially in conditions with high mobility, such as when a TRP is communicating with UE that is in motion.

According to an example embodiment, a UE beamforming gain headroom (BHR) is reported to the TRP and is used to dynamically trigger a UE beam type change. The UE BHR may be utilized in a manner similar to the power headroom (PHR) in uplink power control. The UE BHR is associated with a certain beam pair that may be an active beam pair or a candidate beam pair. The UE BHR is determined based on a UE maximum beamforming gain and a beamforming gain of a UE beam between the UE and the TRP. The UE beam between the UE and the TRP is associated with a UE uplink transmit beam or a UE downlink receive beam. The UE BHR may be defined as a difference between the UE's maximum beamforming gain and a current beamforming gain, i.e., UE BHR=UE maximum beamforming gain−current beamforming gain.

The UE BHR may be different for downlink beam pairs and uplink beam pairs, in the case of when different UE beam types are used in the uplink and the downlink. The BHR for the uplink beam includes a difference between a UE maximum transmit beamforming gain and a beamforming gain of the UE transmit beam between the UE and the TRP. The BHR for the downlink beam including a difference between a UE maximum receive beamforming gain and a beamforming gain of the UE receive beam between the UE and the TRP. In such a situation, the BHR may be common for both uplink and downlink beams, where UE always uses the same beam type to transmit and receive. Or, the BHR may be different for the uplink beam and the downlink beam, where UE transmit and receive beams may use different beam types. The UE BHR may be defined as UE BHR$_{UPLINK}$=UE maximum transmit beamforming gain−current transmit beamforming gain, and UE BHR$_{DOWNLINK}$=UE maximum receive beamforming gain−current receive beamforming gain.

According to an example embodiment, a TRP indicates a TRP BHR (similar to the UE BHR but generated by the TRP instead of the UE) associated with an active downlink and/or uplink beam pair to UE, which may then make recommendations to the TRP regarding a possible beam type change in the TRP based on the TRP BHR. The TRP BHR is determined based on a TRP maximum beamforming gain and a beamforming gain of a TRP beam between the TRP and the UE. The TRP beam between the TRP and the UE is associated with a TRP downlink transmit beam or a TRP uplink receive beam. The TRP BHR may be defined as a difference between the TRP's maximum beamforming gain and a current beamforming gain, i.e., TRP BHR=TRP maximum beamforming gain−current beamforming gain.

The TRP BHR may be different for downlink beam pairs and uplink beam pairs, in the case of when different beam types are used in the uplink and the downlink. The BHR for the uplink beam includes a difference between a TRP maximum receive beamforming gain and a beamforming gain of the TRP receive beam between the TRP and the UE. The BHR for the downlink beam including a difference between a TRP maximum transmit beamforming gain and a beamforming gain of the TRP transmit beam between the TRP and the UE. In such a situation, the BHR may be common for both uplink and downlink beams, where TRP always uses the same beam type to transmit and receive. Or, the BHR may be different for the uplink beam and the downlink beam, where TRP transmit and receive beams may use different beam types. The TRP BHR may be defined as TRP $BHR_{UPLINK}$=TRP maximum receive beamforming gain−current receive beamforming gain, and TRP $BHR_{DOWNLINK}$=TRP maximum transmit beamforming gain−current transmit beamforming gain.

According to an example embodiment, the UE explicitly reports the UE BHR. After initial uplink and/or downlink beam management, the UE reports the UE BHR associated with an active beam pair (the beam pair in use) or a candidate beam pair to the TRP. Alternatively, the TRP requests the UE to report the UE BHR associated with a specified beam pair. The specified beam pair may or may not be the active beam pair. The specified beam pair may be an uplink beam pair or downlink beam pair.

According to an example embodiment, the UE implicitly reports the UE BHR. In an initial access, the UE reports a maximum transmit and/or receive beamforming gain. After initial uplink and/or downlink beam management, the UE reports the transmit and/or receive beamforming gain (for the active beam pair, for example). Alternatively, the TRP requests the UE to report the transmit and/or receive beamforming gain associated with a specified beam pair (uplink and/or downlink). The specified beam pair may or may not be the active beam pair. With the information reported by the UE, the TRP can determine the UE BHR and adapt the UE beam as needed.

According to an example embodiment, UE BHR can be part of UE PHR report. When TRP indicates an uplink power adjustment to UE, UE may decide locally whether to adjust uplink transmission power or adapt transmission and/or receive beam type. UE may also adjust uplink transmission power in conjunction with uplink and/or downlink beam adaptation. The associated beam adaptation may be transparent to TRP if UE's beams are calibrated and UE has accurate beam correspondence information. Otherwise the associated beam adaptation may trigger further uplink and/or downlink beam management, which are P-3 and/or U-3 procedures as agreed in 5G NR. The associated beam adaptation may also trigger an uplink and/or downlink power adjustment. As a result, the UE may need to report an updated PHR to the TRP.

According to an example embodiment, in an initial access, the UE reports a beam type set with all possible UE transmit and receive beam types with associated beamforming gain and beam width, for example, in random access Msg3 or in a radio resource control (RRC) message after random access is complete. As an example, the beam type set can be reported in a format as: {{beam_type 0, beamforming_gain 0, beam_width 0}, {beam_type 1, beamforming_gain 1, beam_width 1} . . . }. As another example, the beam type set can be reported in a format as: {{beamforming_gain 0, beam_width 0}, {beamforming_gain 1, beam_width 1} . . . }, and a beam type index is not explicitly indicated. As other example, the beam type set can be reported in a format as: {{beamforming_gain 0}, {beamforming_gain 1} . . . }, a beam type index and beam width are not explicitly indicated. Beam type set for UE transmit beam and receive beam can be reported jointly, where UE transmit and receive beam have the same beam type set, or separately, where UE transmit and receive beam may have different beam type set. After the TRP receives the beam type set, the TRP determines the UE maximum transmit and/or receive beamforming gain from UE maximum beamforming gains in the beam type set. After initial uplink and/or downlink beam management, the UE reports the transmit and/or receive beamforming gain or a beam type index for an active uplink beam pair and/or downlink beam pair which is in use for data transmission or for a candidate uplink beam pair and/or downlink beam pair. The report can be initiated by the UE or requested by the TRP. Based on the UE reports, the TRP may adapt the UE transmit and/or receive beam type by explicitly indicating a transmit and/or receive beam type index or beamforming gain selected from the beam type set reported by the UE. As an example, if the UE reports the beam type index for beam_type 0 associated with an uplink transmit beam, the TRP may obtain the current beamforming gain based on the beam type set and the beam type index, i.e., beamforming_gain 0 in the beam type set. The TRP then determines the UE $BHR_{UPLINK}$ based on the UE maximum transmit beamforming gain and the obtained current beamforming gain, and recommends UE beam type changed in uplink according to the UE $BHR_{UPLINK}$ and the beam widths indicated in the beam type set. The TRP may also adapt UE beam in conjunction with an uplink power adjustment.

According to an example embodiment, the TRP explicitly indicates a TRP BHR to the UE. After uplink and/or downlink initial beam management, the TRP indicates the TRP BHR associated with the active beam pair to the UE. Alternatively, the UE may request the TRP to indicate the TRP BHR associated with a specified beam pair. The specified beam pair may or may not be the active beam pair. The specified beam pair can be an uplink beam pair or a downlink beam pair.

According to an example embodiment, the TRP implicitly indicates a TRP BHR to the UE. The TRP broadcasts a maximum transmit and/or receive beamforming gain in the system information, such as in a system information block (SIB), for example. After uplink and/or downlink initial beam management, the TRP indicates a transmit and/or receive beamforming gain to the UE. Alternatively, the UE may request the TRP to indicate the transmit and/or receive beamforming gain associated with a specified uplink and/or downlink beam pair. The specified beam pair may or may not be the active beam pair. With the information indicated by the TRP, UE can determine the TRP BHR and recommend TRP beam type change as needed.

According to an example embodiment, if downlink power control is enabled in a beam-based access system, where the TRP indicates a TRP PHR to the UE, the TRP BHR can be part of TRP PHR indication. When the UE recommends a downlink power adjustment, the TRP may decide whether to make the adjustment. The TRP may also decide whether to adjust downlink transmission power or adapt downlink and/or uplink beam type. The TRP may also adjust downlink transmission power in conjunction with transmission and/or receive beam adaptation. The associated beam adaptation may be transparent to the UE or it may trigger further downlink and/or uplink beam management, which are P-2 and/or U-2 procedures as agreed in 5G NR.

According to an example embodiment, the TRP broadcasts a beam type set with all possible TRP transmit and receive beam types with associated beamforming gain and beam width in the system information, such as in a SIB. As an example, the beam type set can be broadcasted in a format as: {{beam_type 0, beamforming_gain 0, beam_width 0}, {beam_type 1, beamforming_gain 1, beam_width 1} ... }. As another example, the beam type set can be reported in a format as: {{beamforming_gain 0, beam_width 0}, {beamforming_gain 1, beam_width 1} ... }, and a beam type index is not explicitly indicated. As other example, the beam type set can be reported in a format as: {{beamforming_gain 0}, {beamforming_gain 1} ... }, a beam type index and beam width are not explicitly indicated. Beam type set for TRP transmit beam and receive beam can be indicated jointly, where TRP transmit and receive beam have the same beam type set, or separately, where TRP transmit and receive beam may have different beam type set. After the UE receives the beam type set, the UE determines the TRP maximum transmit and/or receive beamforming gain from TRP maximum beamforming gains in the beam type set. After uplink and/or downlink initial beam management, the TRP indicates to the UE a transmit and/or receive beam type index or beamforming gain for an active beam pair which is in use for data transmission. Alternatively, the UE may request the TRP to indicate the transmit and/or receive beam type index or beamforming gain associated with a specified uplink and/or downlink beam pair. The specified beam pair may or may not be the active beam pair. With the information indicated by the TRP, the UE can determine the TRP BHR and recommends TRP beam type change in downlink and/or uplink as needed. As an example, if the TRP indicates the beam type index for beam_type 1 associated with a downlink transmit beam, the UE may obtain the current TRP transmit beamforming gain based on the beam type set and the beam type index, i.e., beamforming_gain 1 in the beam type set. The UE then determines the TRP $BHR_{DOWNLINK}$ based on the TRP maximum transmit beamforming gain and the obtained current transmit beamforming gain, and recommends TRP transmit beam type changed according to the TRP $BHR_{DOWNLINK}$ and the beam widths indicated in the beam type set. TRP beam adaptation may also be in conjunction with a downlink power adjustment.

For the discussion of an example scenario where UE is moving away from a TRP, consider a deployment where UE located at a cell center has set up a beam-based connection with a TRP after uplink and/or downlink beam management, and the UE is moving away from the TRP. The TRP may indicate to the UE to increase the transmit power level in accordance with a PHR report received from the UE. Alternatively, the TRP may indicate to the UE to adapt the modulation and coding scheme (MCS) level, automatic repeat requested or hybrid automatic repeat requested ((H)ARQ) re-transmission level, and so on. As yet another alternative, the TRP may indicate to the UE to increase the transmit power level and adapt the MCS level, (H)ARQ re-transmission level, and so on. It is noted that the uplink power control and link adaptation may be performed before, after, or in conjunction with the BHR based beam adaptation.

In a situation where there is no room for the UE to further adjust transmit power level (as well as MCS level, (H)ARQ re-transmission level, and so on), the TRP may decide whether to increase a transmit and/or receive beamforming gain in accordance with the TRP BHR. For example, if TRP BHR=0, it is impossible for the TRP to increase TRP beamforming gain. If TRP BHR>0, the TRP can decide whether to increase the transmit and/or receive beamforming gain or not. Further, if increasing the transmit and/or receive beamforming gain, the TRP can decide to adapt the TRP beams or adapt the UE beams. As an example, the TRP indicates to the UE to increase the beamforming gain at transmit and/or receive beams, in accordance with the UE BHR report. The TRP may indicate to the UE to switch beamforming gain 1 to beamforming gain 2. Beamforming gain 2 has a higher beamforming gain than beamforming gain 1. This indication may trigger uplink and/or downlink beam management, which are P-3 and U-3 procedures as agreed to in 5G NR. In the case where the TRP increases a transmit and/or receive beamforming gain to communicate with the UE, the increase in the transmit and/or receive beamforming gain may also trigger uplink and/or downlink beam management, which are P-2 and U-2 procedures as agreed to in 5G NR.

As another example, in a situation where UE BHR=0, where there is no room for the UE to increase beamforming gain, it is still possible to adapt the TRP beams to increase the beamforming gain. It is noted that order of beam adaptation in the UE and the TRP may be dynamic. However, it may be preferred to adapt the TRP beams prior to adapting the UE beams because the TRP generally has more capability and less sensitivity. In other words, the UE beams are adapted after the TRP beams due to the sensitivity of the UE, due to UE mobility and rotation, etc. The associated uplink and/or downlink beam adaptation may also be performed in conjunction with an uplink and/or downlink transmit power adjustment to cope with the new transmit and/or receive beamforming gain.

After uplink and/or downlink beam management, the UE reports an updated UE BHR as well as associated PHR to the TRP. The TRP may also indicate an updated TRP BHR and PHR to the UE.

For the discussion of an example scenario where a UE triggers beam adaptation, consider a situation where UE that is in motion has set up a beam-based connection with a TRP after uplink and/or downlink beam management. The UE subsequently becomes stationary. The UE may switch its transmit and/or receive beam to narrow beam (with resulting high beamforming gain) if UE BHR>0. Narrow beam usually means narrow width beam. Or the UE may recommend the TRP to switch to narrow beams (with resulting high beamforming gain) for better link quality based on TRP indicated BHR. The TRP may follow the UE's recommendation, which may trigger uplink and/or downlink beam management, which are P-2 and U-2 procedures respectively as agreed to in 5G NR. After uplink and/or downlink beam management, the TRP may indicate an updated TRP BHR to the UE. UE beam adaptation may also trigger uplink and/or downlink beam management, which are P-3 and U-3 procedures respectively as agreed to in 5G NR. After beam management, the UE need update TRP with a new BHR or a new beam type.

Figure 2A:
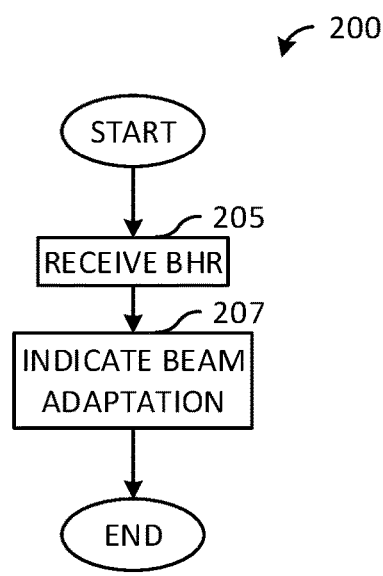
FIG. 2A illustrates a flow diagram of example operations 200 occurring in a TRP performing beam adaptation using UE BHR according to example embodiments described herein.

FIG. 2A illustrates a flow diagram of example operations 200 occurring in a TRP performing beam adaptation using UE BHR. Operations 200 begin with the TRP receiving a UE BHR from UE (block 205). The TRP may indicate a beam adaptation in accordance with the UE BHR (block 207). The beam adaptation indication is also named as a beam change indicator. In an example, the TRP conducts uplink power control and determines that there is not enough room left for UE to further increase transmission power to make up the link budget deficiency in uplink transmissions. TRP may then instruct UE to adapt uplink transmit beam in accordance with the UE reported BHR associated with that uplink transmit beam. The UE may report UE BHR to TRP in different approaches.

According to an example embodiment, the UE uses a medium access control-control element (MAC-CE) to report the UE BHR to the TRP. The MAC control element is identified by a MAC protocol data unit (PDU) subheader with Logical channel id (LCID). The MAC control element for UE BHR may be separate from a MAC-CE for PHR, see FIG. 2B. Or the MAC control element for UE BHR may be combined together with the MAC control element for PHR. See FIG. 2C.

In FIGS. 2B and 2C,
–R: reserved bit, set to "0"
PH: power headroom
BH: beamforming gain headroom According to an example embodiment, the UE uses RRC messages (for example, RRC Connection Setup, or RRC Connection Reconfiguration) to report the UE BHR. The RRC message, for example, the RRC Connection Reconfiguration message, includes a MAC-MainConfig information element. The UE may configure the MAC-MainConfig information element to report the BHR at FIG. 2D. The UE may also configure the phr-Config in the MAC-MainConfig information element to report the BHR at FIG. 2E.

According to another example embodiment, the UE uses a physical uplink control channel (PUCCH) to report the UE BHR. Using LTE as an example, a physical control channel is transmitted on an aggregation of one or several consecutive control channel elements (CCEs), where a control channel element corresponds to 9 resource element groups.

UE may explicitly report UE BHR to TRP through MAC-CE as illustrated in FIG. 2B or 2C, or an RRC message as illustrated in FIG. 2D or 2E, or PUCCH. For implicit UE BHR, UE may report UE maximum beamforming gain, UE maximum transmit beamforming gain, or UE maximum receive beamforming gain to TRP through MAC-CE as illustrated in FIG. 2B or 2C, or RRC message as illustrated in FIG. 2D or 2E, or PUCCH. UE may report a current beamforming gain, a current transmit beamforming gain, or a current receive beamforming gain to TRP through MAC-CE as illustrated in FIG. 2B or 2C, or an RRC message as illustrated in FIG. 2D or 2E, or PUCCH.

Figure 3A:
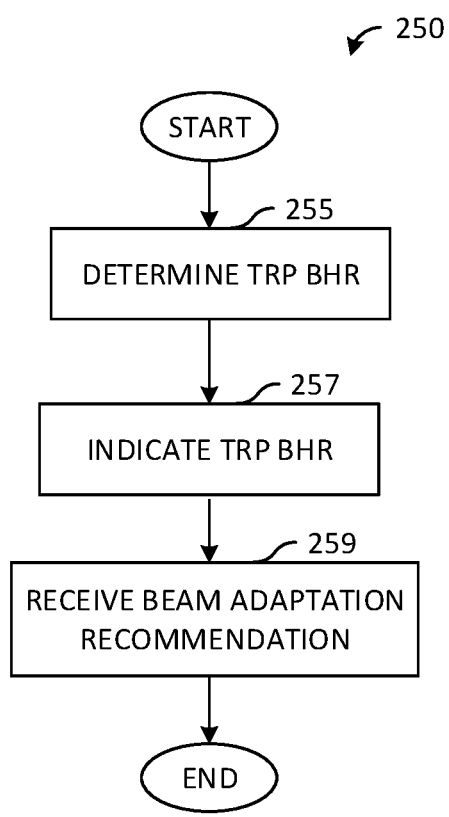
FIG. 3A illustrates a flow diagram of example operations 250 occurring in a TRP performing beam adaptation using TRP BHR according to example embodiments described herein.

FIG. 3A illustrates a flow diagram of example operations 250 occurring in a TRP performing beam adaptation using TRP BHR. Operations 250 begin with the TRP determining a TRP BHR (block 255) and indicating the TRP BHR to the UE (block 257). The TRP may indicate TRP BHR to the UE in different approaches at block 257. The TRP receives a beam adaptation recommendation from the UE (block 259). The beam adaptation recommendation is also named as a beam change recommendation.

According to an example embodiment, the TRP uses a medium access control-control element (MAC-CE) to indicate the TRP BHR to the UE. The MAC control element is identified by a MAC protocol data unit (PDU) subheader with Logical channel id (LCID). The MAC control element for TRP BHR may be separate from a MAC-CE for PHR, see FIG. 2B. Or the MAC control element for TRP BHR may be combined together with the MAC control element for PHR. See FIG. 2C.

According to an example embodiment, the TRP uses RRC messages (for example, RRC Connection Setup, or RRC Connection Reconfiguration) to indicate the TRP BHR. The RRC message, for example, the RRC Connection Reconfiguration message, includes a MAC-MainConfig information element. The TRP may configure the MAC-MainConfig information element to indicate the BHR at FIG. 2D. The TRP may also configure the phr-Config in the MAC-MainConfig information element to indicate the BHR at FIG. 2E.

According to another example embodiment, the TRP uses a physical downlink control channel (PDCCH) to indicate the TRP BHR. Using LTE as an example, a physical control channel is transmitted on an aggregation of one or several consecutive control channel elements (CCEs), where a control channel element corresponds to 9 resource element groups.

The TRP may explicitly indicate TRP BHR to the UE through MAC-CE as illustrated in FIG. 2B or 2C, or an RRC message as illustrated in FIG. 2D or 2E, or PDCCH. For implicit TRP BHR, the TRP may indicate TRP maximum beamforming gain, TRP maximum transmit beamforming gain, or TRP maximum receive beamforming gain to the UE through MAC-CE as illustrated in FIG. 2B or 2C, or RRC message as illustrated in FIG. 2D or 2E, or PDCCH. The TRP may indicate a current beamforming gain, a current transmit beamforming gain, or a current receive beamforming gain to the UE through MAC-CE as illustrated in FIG. 2B or 2C, or an RRC message as illustrated in FIG. 2D or 2E, or PDCCH.

FIG. 3B illustrates a flow diagram of example operations 300 occurring in UE performing beam adaptation using UE BHR. Operations 300 begin with the UE determining a UE BHR (block 305) and sending the UE BHR to the TRP (block 307). The UE may report the UE BHR to the TRP through MAC-CE as illustrated in FIG. 2B or 2C, or an RRC message as illustrated in FIG. 2D or 2E, or PUCCH at block 307. The UE receives a beam adaptation indication from the TRP (block 309). The beam adaptation indication is also named as a beam change indicator.

FIG. 3C illustrates a flow diagram of example operations 350 occurring in UE performing beam adaptation using TRP BHR. Operations 350 begin with the UE receiving an indication of a TRP BHR (block 355). The UE sends a beam adaptation recommendation in accordance with the TRP BHR (block 357). Before operations 350, the TRP may indicate TRP BHR to the UE through MAC-CE as illustrated in FIG. 2B or 2C, or an RRC message as illustrated in FIG. 2D or 2E, or PDCCH.

Figure 4:
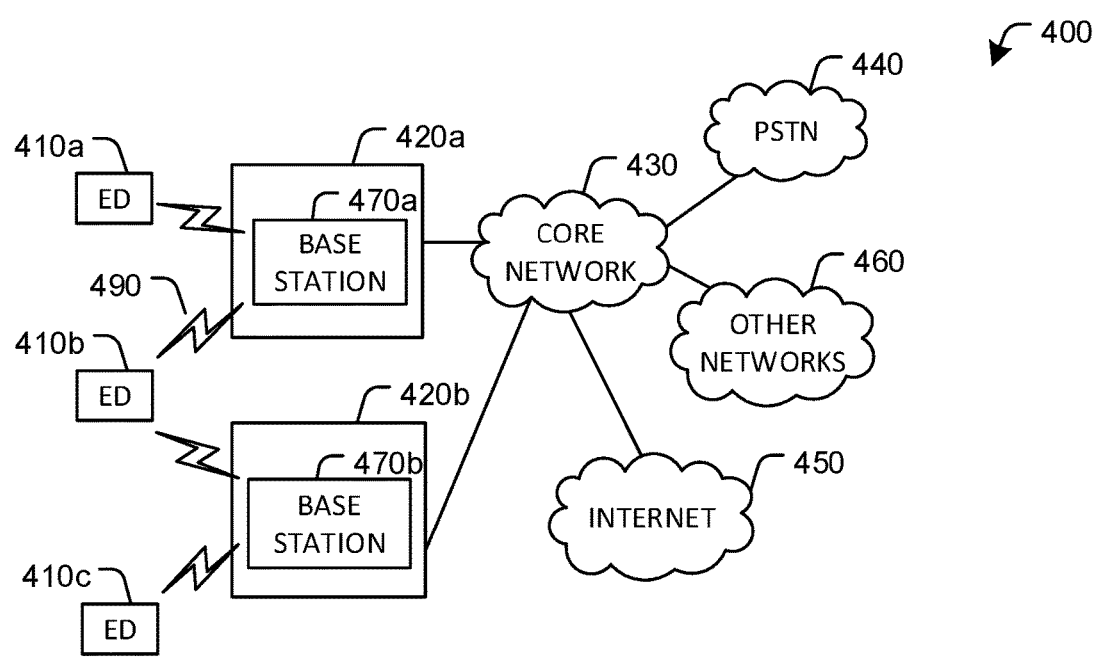
FIG. 4 illustrates an example communication system according to example embodiments described herein.

FIG. 4 illustrates an example communication system 400. In general, the system 400 enables multiple wireless or wired users to transmit and receive data and other content. The system 400 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 400 includes electronic devices (ED) 410a-410c, radio access networks (RANs) 420a-420b, a core network 430, a public switched telephone network (PSTN) 440, the Internet 450, and other networks 460. While certain numbers of these components or elements are shown in FIG. 4, any number of these components or elements may be included in the system 400.

The EDs 410a-410c are configured to operate and/or communicate in the system 400. For example, the EDs 410a-410c are configured to transmit and/or receive via wireless or wired communication channels. Each ED 410a-410c represents any suitable end user device and may include such devices (or may be referred to) as a user equipment/device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 420a-420b here include base stations 470a-470b, respectively. Each base station 470a-470b is configured to wirelessly interface with one or more of the EDs 410a-410c to enable access to the core network 430, the PSTN 440, the Internet 450, and/or the other networks 460. For example, the base stations 470a-470b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 410a-410c are configured to interface and communicate with the Internet 450 and may access the core network 430, the PSTN 440, and/or the other networks 460.

In the embodiment shown in FIG. 4, the base station 470a forms part of the RAN 420a, which may include other base stations, elements, and/or devices. Also, the base station 470b forms part of the RAN 420b, which may include other base stations, elements, and/or devices. Each base station 470a-470b operates to transmit and/or receive wireless signals within a particular geographic region or area, sometimes referred to as a "cell." In some embodiments, multiple-input multiple-output (MIMO) technology may be employed having multiple transceivers for each cell.

The base stations 470a-470b communicate with one or more of the EDs 410a-410c over one or more air interfaces 490 using wireless communication links. The air interfaces 490 may utilize any suitable radio access technology.

It is contemplated that the system 400 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 420a-420b are in communication with the core network 430 to provide the EDs 410a-410c with voice, data, application, Voice over Internet Protocol (VoIP), or other services. Understandably, the RANs 420a-420b and/or the core network 430 may be in direct or indirect communication with one or more other RANs (not shown). The core network 430 may also serve as a gateway access for other networks (such as the PSTN 440, the Internet 450, and the other networks 460). In addition, some or all of the EDs 410a-410c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 450.

Although FIG. 4 illustrates one example of a communication system, various changes may be made to FIG. 4. For example, the communication system 400 could include any number of EDs, base stations, networks, or other components in any suitable configuration.

Figure 5A:
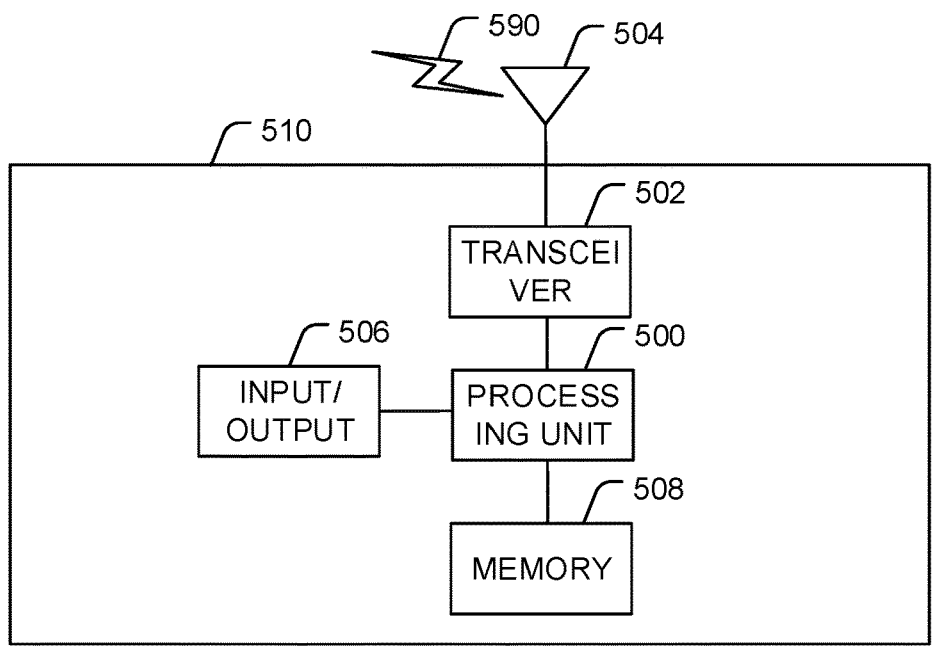
FIGS. 5A and 5B illustrate example devices that may implement the methods and teachings according to this disclosure.
Figure 5B:
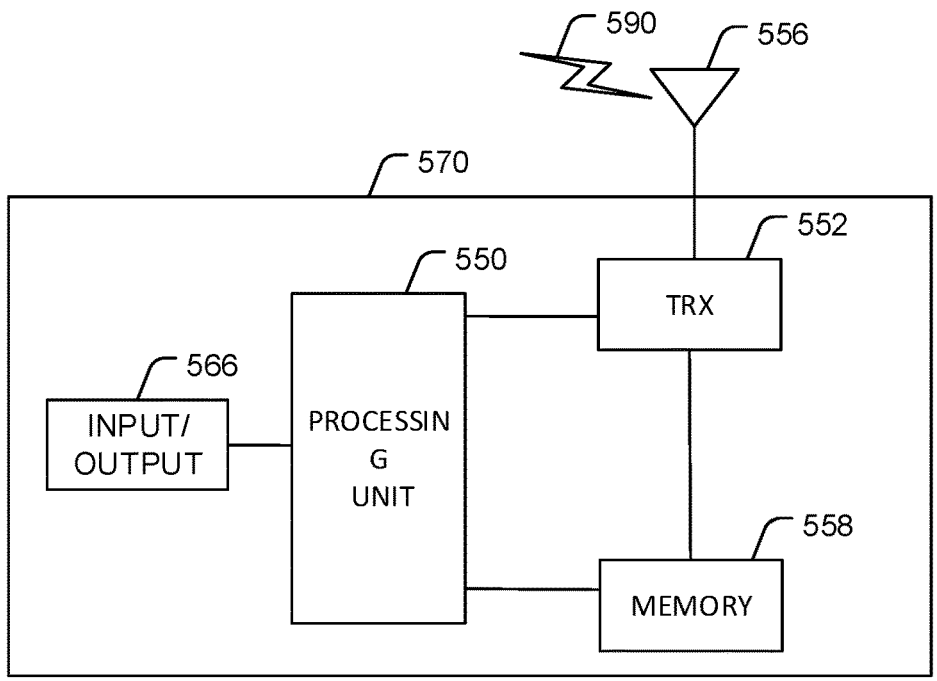

FIGS. 5A and 5B illustrate example devices that may implement the methods and teachings according to this disclosure. In particular, FIG. 5A illustrates an example ED 510, and FIG. 5B illustrates an example base station 570. These components could be used in the system 400 or in any other suitable system.

As shown in FIG. 5A, the ED 510 includes at least one processing unit 500. The processing unit 500 implements various processing operations of the ED 510. For example, the processing unit 500 could perform signal coding, data processing, power control, input/output processing, or any other functionality enabling the ED 510 to operate in the system 400. The processing unit 500 also supports the methods and teachings described in more detail above. Each processing unit 500 includes any suitable processing or computing device configured to perform one or more operations. Each processing unit 500 could, for example, include a microprocessor, microcontroller, digital signal processor, field programmable gate array, or application specific integrated circuit.

The ED 510 also includes at least one transceiver 502. The transceiver 502 is configured to modulate data or other content for transmission by at least one antenna or NIC (Network Interface Controller) 504. The transceiver 502 is also configured to demodulate data or other content received by the at least one antenna 504. Each transceiver 502 includes any suitable structure for generating signals for wireless or wired transmission and/or processing signals received wirelessly or by wire. Each antenna 504 includes any suitable structure for transmitting and/or receiving wireless or wired signals. One or multiple transceivers 502 could be used in the ED 510, and one or multiple antennas 504 could be used in the ED 510. Although shown as a single functional unit, a transceiver 502 could also be implemented using at least one transmitter and at least one separate receiver.

The ED 510 further includes one or more input/output devices 506 or interfaces (such as a wired interface to the Internet 450). The input/output devices 506 facilitate interaction with a user or other devices (network communications) in the network. Each input/output device 506 includes any suitable structure for providing information to or receiving/providing information from a user, such as a speaker, microphone, keypad, keyboard, display, or touch screen, including network interface communications.

In addition, the ED 510 includes at least one memory 508. The memory 508 stores instructions and data used, generated, or collected by the ED 510. For example, the memory 508 could store software or firmware instructions executed by the processing unit(s) 500 and data used to reduce or eliminate interference in incoming signals. Each memory 508 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 5B, the base station 570 includes at least one processing unit 550, at least one transceiver 552, which includes functionality for a transmitter and a receiver, one or more antennas 556, at least one memory 558, and one or more input/output devices or interfaces 566. The memory 558 could store software or firmware instructions executed by the processing unit(s) 550. A scheduler, which would be understood by one skilled in the art, is coupled to the processing unit 550. The scheduler could be included within or operated separately from the base station 570. The processing unit 550 implements various processing operations of the base station 570, such as signal coding, data processing, power control, input/output processing, or any other functionality. The processing unit 550 can also support the methods and teachings described in more detail above. Each processing unit 550 includes any suitable processing or computing device configured to perform one or more operations. Each processing unit 550 could, for example, include a microprocessor, microcontroller, digital signal processor, field programmable gate array, or application specific integrated circuit.

Each transceiver 552 includes any suitable structure for generating signals for wireless or wired transmission to one or more EDs or other devices. Each transceiver 552 further includes any suitable structure for processing signals received wirelessly or by wire from one or more EDs or other devices. Although shown combined as a transceiver 552, a transmitter and a receiver could be separate components. Each antenna 556 includes any suitable structure for transmitting and/or receiving wireless or wired signals. While a common antenna 556 is shown here as being coupled to the transceiver 552, one or more antennas 556 could be coupled to the transceiver(s) 552, allowing separate antennas 556 to be coupled to the transmitter and the receiver if equipped as separate components. Each memory 558 includes any suitable volatile and/or non-volatile storage and retrieval device(s). Each input/output device 566 facilitates interaction with a user or other devices (network communications) in the network. Each input/output device 566 includes any suitable structure for providing information to or receiving/providing information from a user, including network interface communications.

Figure 6:
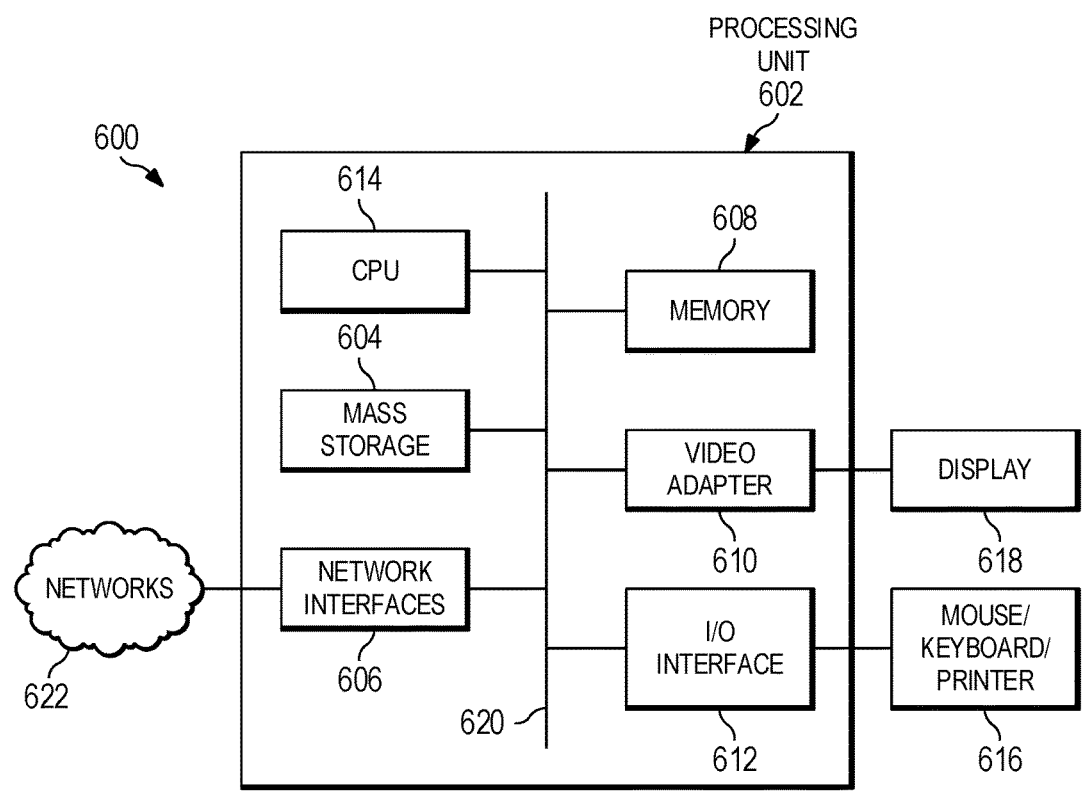
FIG. 6 is a block diagram of a computing system that may be used for implementing the devices and methods disclosed herein.

FIG. 6 is a block diagram of a computing system 600 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 600 includes a processing unit 602. The processing unit includes a central processing unit (CPU) 614, memory 608, and may further include a mass storage device 604, a video adapter 610, and an I/O interface 612 connected to a bus 620.

The bus 620 may be one or more of any type of several bus architectures including a memory bus or memory controller, a peripheral bus, or a video bus. The CPU 614 may include any type of electronic data processor. The memory 608 may include any type of non-transitory system memory such as static random access memory (SRAM), dynamic random access memory (DRAM), synchronous DRAM (SDRAM), read-only memory (ROM), or a combination thereof. In an embodiment, the memory 608 may include ROM for use at boot-up, and DRAM for program and data storage for use while executing programs.

The mass storage 604 may include any type of non-transitory storage device configured to store data, programs, and other information and to make the data, programs, and other information accessible via the bus 620. The mass storage 604 may include, for example, one or more of a solid state drive, hard disk drive, a magnetic disk drive, or an optical disk drive.

The video adapter 610 and the I/O interface 612 provide interfaces to couple external input and output devices to the processing unit 602. As illustrated, examples of input and output devices include a display 618 coupled to the video adapter 610 and a mouse/keyboard/printer 616 coupled to the I/O interface 612. Other devices may be coupled to the processing unit 602, and additional or fewer interface cards may be utilized. For example, a serial interface such as Universal Serial Bus (USB) (not shown) may be used to provide an interface for an external device.

The processing unit 602 also includes one or more network interfaces 606, which may include wired links, such as an Ethernet cable, and/or wireless links to access nodes or different networks. The network interfaces 606 allow the processing unit 602 to communicate with remote units via the networks. For example, the network interfaces 606 may provide wireless communication via one or more transmitters/transmit antennas and one or more receivers/receive antennas. In an embodiment, the processing unit 602 is coupled to a local-area network 622 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

The following references are related to subject matter of the present application. Each of these references is incorporated herein by reference in its entirety:

3GPP TSG RAN WG1 Meeting #86, "Chairman's Notes," August 2016;
3GPP TSG RAN WG1 Meeting #86bis, "Chairman's Notes," October 2016;
3GPP TSG RAN WG1 Meeting NR Ad-Hoc, "Chairman's Notes," January 2017;
T. Rappaport, R. W. Heath Jr., et al., Millimeter Wave Wireless Communications, Prentice Hall, 2014;
S. Yong, P. Xia and A. Valdes-Garcia, 60 GHz technology for Gbps WLAN and WPAN, John Wiley & Sons, 2011; and
W. Hong et al., "Study and Prototyping of Practically Large-Scale mmWave Antenna Systems for 5G Cellular Devices", IEEE Communications Magazine, September 2014.

Although the present disclosure and its advantages have been described in detail, it should be understood that various changes, substitutions and alterations can be made herein without departing from the spirit and scope of the disclosure as defined by the appended claims.

What is claimed is:

1. A method for beam adaptation in a beam-based communications system including user equipment (UE) and a transmit-receive point (TRP), the method comprising:
   determining, by the UE, a beamforming gain headroom (BHR) based on a UE maximum beamforming gain and a beamforming gain of a UE beam between the UE and the TRP, wherein the BHR is a difference between the UE maximum beamforming gain and the beamforming gain of the UE beam between the UE and the TRP;
   in response to the determining sending, by the UE, the BHR to the TRP; and
   receiving, by the UE, a beam adaptation indication from the TRP wherein the beam adaptation indication is in accordance with the BHR sent to the TRP.

2. The method of claim 1, wherein the BHR is for both uplink and downlink beams, the BHR for the uplink beam including a difference between a UE maximum transmit beamforming gain and a beamforming gain of the UE transmit beam between the UE and the TRP, the BHR for the downlink beam including a difference between a UE maximum receive beamforming gain and a beamforming gain of the UE receive beam between the UE and the TRP.

3. The method of claim 1, wherein the BHR is for an uplink beam, the BHR for the uplink beam including a difference between a UE maximum transmit beamforming gain and a beamforming gain of the UE transmit beam between the UE and the TRP.

4. The method of claim 1, wherein the BHR is for a downlink beam, the BHR for the downlink beam including a difference between a UE maximum receive beamforming gain and a beamforming gain of the UE receive beam between the UE and the TRP.

5. The method of claim 1, wherein the difference is indicated in a medium access control-control element (MAC-CE), or a radio resource control (RRC) message, or a physical uplink control channel (PUCCH).

6. The method of claim 1, wherein the sending the BHR to the TRP comprises:
sending, by the UE, the UE maximum beamforming gain to the TRP through a MAC-CE, or an RRC message; and
sending, by the UE, the beamforming gain of the UE beam between the UE and the TRP through a MAC-CE, or an RRC message, or a PUCCH.

7. The method of claim 1, wherein the sending the BHR to the TRP comprises:
sending, by the UE, a beam type set to the TRP, wherein the beam type set includes a set of beam type indexes, a UE beamforming gain corresponding to a beam type index, and a beam width corresponding to the beam type index; and
sending, by the UE, a first beam type index to the TRP in accordance with the beam type set.

8. The method of claim 1, wherein the sending the BHR to the TRP comprises:
sending, by the UE, a beam type set to the TRP, wherein the beam type set includes a set of beam type indexes, a UE beamforming gain corresponding to a beam type index, and a beam width corresponding to the beam type index; and
sending, by the UE, the beamforming gain of the UE beam between the UE and the TRP to the TRP.

9. A method for beam adaptation in a beam-based communications system including user equipment (UE) and a transmit-receive point (TRP), the method comprising:
determining, by the TRP, a beamforming gain headroom (BHR) based on a TRP maximum beamforming gain and a beamforming gain of a TRP beam between the TRP and the UE, wherein the BHR is a difference between the UE maximum beamforming gain and the beamforming gain of the UE beam between the UE and the TRP;
in response to the determining sending, by the TRP, the BHR to the UE; and
receiving, by the TRP, a beam adaptation recommendation from the UE wherein the beam adaptation indication is in accordance with the BHR sent to the TRP.

10. The method of claim 9, wherein the BHR is for both uplink and downlink beams, the BHR for the uplink beam including a difference between a TRP maximum receive beamforming gain and a beamforming gain of the TRP receive beam between the TRP and the UE, the BHR for the downlink beam including a difference between a TRP maximum transmit beamforming gain and a beamforming gain of the TRP transmit beam between the TRP and the UE.

11. The method of claim 9, wherein the BHR is for an uplink beam, the BHR for the uplink beam including a difference between a TRP maximum receive beamforming gain and a beamforming gain of the TRP receive beam between the TRP and the UE.

12. The method of claim 9, wherein the BHR is for a downlink beam, the BHR for the downlink beam including a difference between a TRP maximum transmit beamforming gain and a beamforming gain of the TRP transmit beam between the TRP and the UE.

13. The method of claim 9, wherein the difference is indicated in a medium access control-control element (MAC-CE), or a radio resource control (RRC) message, or a physical downlink control channel (PDCCH).

14. The method of claim 9, wherein the sending the BHR to the UE comprises:
sending, by the TRP, the TRP maximum beamforming gain to the UE through a MAC-CE, or an RRC message; and
sending, by the TRP, the beamforming gain of the TRP beam between the TRP and the UE through a MAC-CE, or an RRC message, or a PDCCH.

15. The method of claim 9, wherein the sending the BHR to the UE comprises:
sending, by the TRP, a beam type set to the UE, wherein the beam type set includes a set of beam type indexes, a TRP beamforming gain corresponding to a beam type index, and a beam width corresponding to the beam type index; and
sending, by the TRP, a first beam type index to the UE in accordance with the beam type set.

16. The method of claim 9, wherein the sending the BHR to the UE comprises:
sending, by the TRP, a beam type set to the UE, wherein the beam type set includes a set of beam type indexes, a TRP beamforming gain corresponding to a beam type index, and a beam width corresponding to the beam type index; and
sending, by the TRP, the beamforming gain of the TRP beam between the TRP and the UE to the UE.

17. User equipment (UE) in a beam-based communications system, comprising:
a memory storage comprising instructions; and
one or more processors in communication with the memory, wherein the one or more processors executes the instructions to:
determine a beamforming gain headroom (BHR) based on a UE maximum beamforming gain and a beamforming gain of a UE beam between the UE and a transmit-receive point (TRP), wherein the BHR is a difference between the UE maximum beamforming gain and the beamforming gain of the UE beam between the UE and the TRP;
in response to the determining send the BHR to the TRP; and
receive a beam adaptation indication from the TRP wherein the beam adaptation indication is in accordance with the BHR sent to the TRP.

18. The UE of claim 17, wherein the BHR is for both uplink and downlink beams, the BHR for the uplink beam including a difference between a UE maximum transmit beamforming gain and a transmit beamforming gain of the UE beam between the UE and the TRP, the BHR for the downlink beam including a difference between a UE maximum receive beamforming gain and a receive beamforming gain of the UE beam between the UE and the TRP.

* * * * *